UNITED STATES PATENT OFFICE.

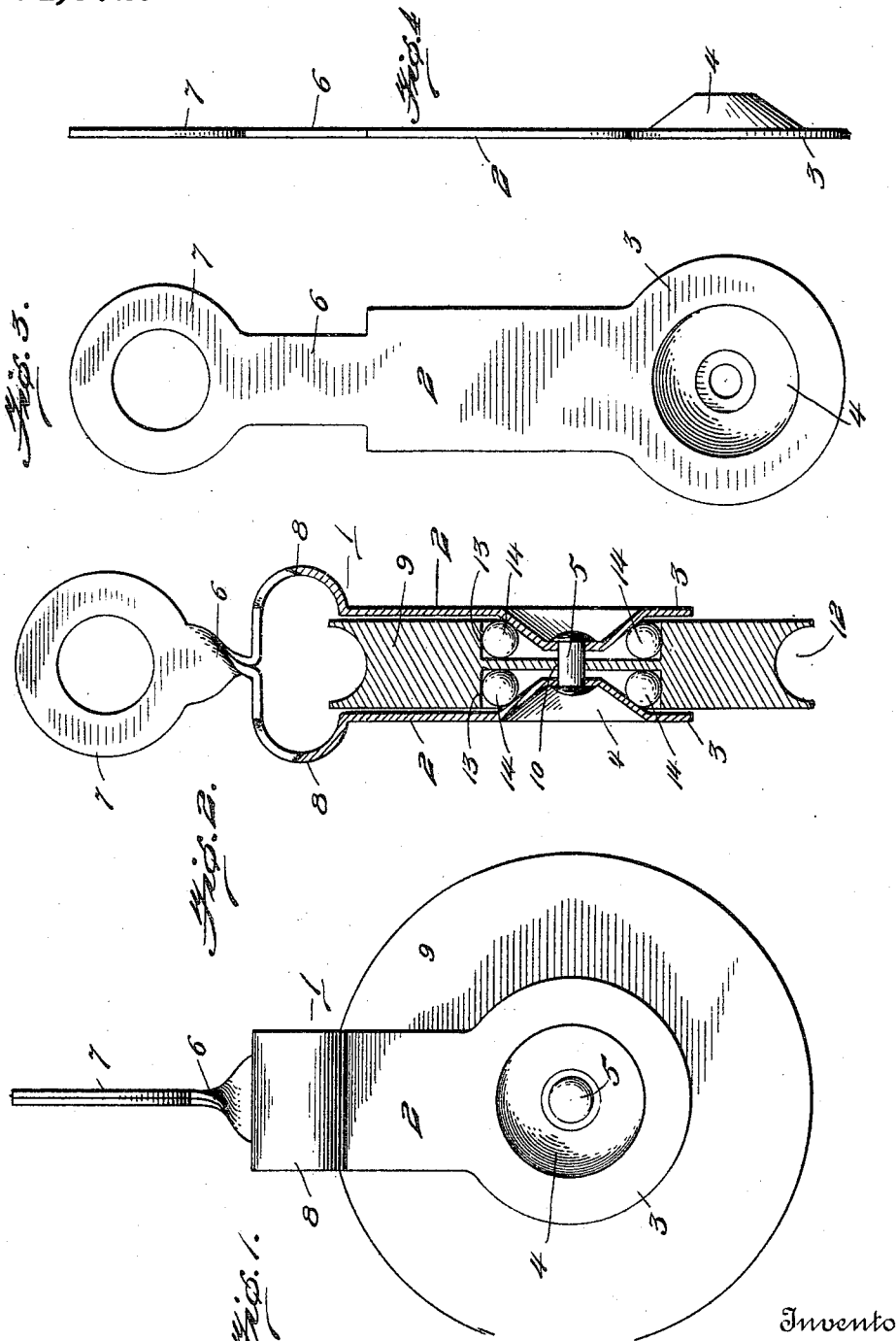

JOSEPH T. MORRISON, OF HARTFORD, CONNECTICUT, ASSIGNOR OF ONE-HALF TO CHARLES J. STAFFORD, OF HARTFORD, CONNECTICUT.

PULLEY.

964,672.

Specification of Letters Patent.

Patented July 19, 1910.

Application filed March 11, 1909. Serial No. 482,705.

*To all whom it may concern:*

Be it known that I, JOSEPH T. MORRISON, a citizen of the United States, residing at Hartford, in the county of Hartford and State of Connecticut, have invented certain new and useful Improvements in Pulleys; and I do declare the following to be a full, clear, and exact description of the invention, such as will enable others skilled in the art to which it appertains to make and use the same.

This invention relates to improvements in pulleys.

The object of the invention is to provide an improved construction of pulley having its frame formed of metal plates which are pressed at their lower ends into the required shape to form a ball race to receive bearing balls on which the pulley wheel is revolubly mounted.

A further object is to provide a pulley having its frame constructed to permit the passage of knots which may be in the cable or rope engaged with the pulley.

With the foregoing and other objects in view, the invention consists of certain novel features of construction, combination and arrangement of parts as will be more fully described and particularly pointed out in the appended claim.

In the accompanying drawings, Figure 1 is side view of a pulley constructed in accordance with the invention; Fig. 2 is a vertical cross sectional view taken through the center of the same; Figs. 3 and 4 are, respectively, side and edge views of one of the side plates of the frame.

Referring more particularly to the drawings, 1 denotes the pulley frame which consists of two metal plates which are bent into suitable shapes and secured together to form the sides of the frame, as shown. The plates each consists of an oblong strip 2 forming the body portion of the frame said strip having formed at its lower end a circular bearing portion 3, said portion being pressed or bent inwardly at its center to form a bearing cone or ball race 4. In the center of the portion 3 is formed an aperture to receive the end of the pulley shaft 5.

The upper end of the strip 2 forming the body portion of the side plate is reduced to form a neck 6 and on the upper end of said neck is formed an eye 7. The upper end of the strip 2 immediately below the neck portion 6 is bent outwardly and then inwardly to form a loop 8, the purpose of which will hereinafter appear.

In assembling the parts to form the frame of the pulley the side plates are brought together until the neck portions 6 thereof are engaged, said neck portions are then twisted together to bring the eye members 7 at right angles to the edge of the plates, as shown in Fig. 2 of the drawings. When the plates have been thus brought together, the pulley 9 is arranged between the body portions of the side plates 2, and through the bearing eye 10 of the pulley and the alined apertures formed in the bearing portions 3 of the side plates is inserted the bearing shaft or pin 5 of the pulley.

The pulley 9 consists of an outer rim portion having in its outer edge an annular groove 12 to receive the rope or cable engaged therewith. The center of the pulley is countersunk on each side to form ball races 13 which co-act with the ball races 4 formed in the bearing portion 3 of the side plates to retain series of bearing balls 14 which are arranged on each side of the pulley, as shown. By means of the ball races and bearing balls, the pulley 9 has an anti-frictional engagement with the side plates of the frame and will freely revolve between said plates.

When the side plates have been brought together in the manner hereinbefore described, the looped portions 8 of the same will form an elongated passage immediately above the pulley wheel, said passage permitting knots or obstructions on the cable or rope to readily pass through the frame.

A pulley constructed as herein shown and described will be simple, strong and durable in construction, efficient and reliable in operation and may be inexpensively manufactured.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claim.

Having thus described my invention, what I claim is:

A pulley support comprising a pair of flat side plates provided at their lower ends with enlarged bearing portions pressed inwardly at their centers to form a cone or ball race, U-shaped loops formed by bending portions of the plates inwardly, reduced necks at the outer ends of said loops and enlarged eyed portions formed at the upper ends of the necks, the eyed portions fitting against each other and the neck portions of the plates twisted to dispose the eyed portions at right angles to the side plates.

In testimony whereof I have hereunto set my hand in presence of two subscribing witnesses.

JOSEPH T. MORRISON. [L. S.]

Witnesses:
ENOS H. LANE,
HENRY U. STORRS.